United States Patent [19]
Meredith et al.

[11] Patent Number: 6,052,605
[45] Date of Patent: *Apr. 18, 2000

[54] CONTINUOUS INTERFERENCE ASSESSMENT AND AVOIDANCE IN A LAND MOBILE RADIO SYSTEM

[75] Inventors: Sheldon Kent Meredith; David A. Dye, both of Pheonix, Ariz.

[73] Assignee: Radio Frequency Systems, Inc., Marlboro, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/834,818

[22] Filed: Mar. 31, 1997

[51] Int. Cl.$^7$ ............... H04B 1/10; H04B 1/38; H04M 1/00

[52] U.S. Cl. ............ 455/561; 455/560; 455/562; 455/63

[58] Field of Search .................... 455/126, 443, 455/522, 261, 69, 67.3, 561, 562, 560, 501, 63, 103, 424, 437, 446, 447, 438, 440

[56] References Cited

U.S. PATENT DOCUMENTS

| | | | |
|---|---|---|---|
| 5,574,993 | 11/1996 | Kobayashi et al. | 455/69 |
| 5,649,303 | 7/1997 | Hess et al. | 455/443 |
| 5,670,964 | 9/1997 | Dent | 455/261 |
| 5,715,526 | 2/1998 | Weaver, Jr. et al. | 455/126 |
| 5,764,699 | 6/1998 | Needham et al. | 455/522 |
| 5,815,801 | 9/1998 | Hamalainen et al. | 455/67.3 |
| 6,006,062 | 12/1999 | Ward | 455/438 |

FOREIGN PATENT DOCUMENTS

| | | |
|---|---|---|
| 725498A1 | 1/1996 | European Pat. Off. . |
| 0725498 | 8/1996 | European Pat. Off. . |
| 0781066 | 6/1997 | European Pat. Off. . |
| 2229065 | 9/1990 | United Kingdom . |
| 96/38011 | 11/1996 | WIPO ............... H04Q 7/34 |
| WO9638011 | 11/1996 | WIPO . |
| 97/31501 | 8/1997 | WIPO ............... H04Q 7/38 |
| WO9731501 | 8/1997 | WIPO . |

*Primary Examiner*—Dwayne D. Bost
*Assistant Examiner*—Raymond B. Persino
*Attorney, Agent, or Firm*—Ware, Fressola, Van Der Sluys & Adolphson LLP

[57] ABSTRACT

In a land mobile radio system including at least one base site having a system for interconnecting a plurality of radio channel units with a plurality of directional antennas and/or antenna beams, the base site further includes an interference avoidance system for controlling communications between each radio channel unit of the base site and mobile radio units communicating with the base site so as to avoid causing potential interference at the operating frequency of each radio channel unit at other base sites. The interference avoidance system monitors potential interference at the operating frequency of each radio channel unit on each antenna beam. If potential interference exists on an antenna beam determined to be the antenna beam best suited for transmitting and receiving signals at the operating frequency of the radio channel unit, a determination is made if adjacent antenna beams have reduced chance of potential interference and sufficient signal strength for communication and therefore are better suited for transmitting signals at the operating frequency of the radio channel unit. To further enhance interference avoidance, a comparison is made of the signal strength of received signals at the operating frequency of the radio channel unit with one or more threshold values to assess the proximity of the mobile radio unit to the base site, and the transmission signal strength for signals transmitted from the radio channel unit to the mobile radio unit are controlled based on the proximity assessment.

15 Claims, 5 Drawing Sheets

CONTINUOUS INTERFERENCE ASSESSMENT AND AVOIDANCE IN A LAND MOBILE RADIO SYSTEM

TECHNICAL FIELD

The present invention is directed to a land mobile radio system, such as a mobile cellular telephone system, personal communications network (PCN), or other high frequency system, and more particularly, to improved monitoring and assessment of potential communications interference in a land mobile radio base site of the land mobile radio system.

BACKGROUND OF THE INVENTION

In a typical land mobile radio system, such as a mobile cellular telephone system or personal communications network (PCN), a plurality of cells are defined which make up the system. Each cell is a geographically defined area wherein communications are handled by a land mobile radio base site (cell site) for mobile units operating within the boundaries of the cell. Although these cells are often represented as hexagons in cell design schemes, in reality, due to terrain and the presence of buildings and other structures, the actual boundary of a cell may have an irregular shape.

As is well known in the art, cell layouts are typically characterized by a frequency reuse pattern where a number of different frequency sets are defined. Each cell uses a particular frequency set, and the cell layout is designed to provide the maximum separation between cells using the same frequency set so as to minimize interference.

It is generally required, depending on the location of the cell site within a cell, that the cell site antennas provide coverage for communications over 360° of azimuth in order to effectively cover the corresponding geographic area. In most existing base sites, either omni-directional antennas or panel antennas are used to provide the 360° of azimuth. If panel antennas are used, the 360° of azimuth is divided into a number of smaller sectors, such as three sectors, with each sector provided with a pair of antennas each having a beamwidth of 120°. A problem associated with such base sites is that even with frequency reuse patterns and strategic positioning of the base sites, unavoidable interference often occurs which degrades the quality of communications between mobile radio units and the base site.

Recently, base sites have been developed having a sectorized antenna configuration wherein a large number of directional antennas or antennas having a large number of directional beams are employed. It would be desirable to control such a base site to more accurately monitor and avoid potential interference to thereby maintain a high quality of communications between mobile radio units and the various base sites in a land mobile radio system.

SUMMARY OF THE INVENTION

An object of the invention is improved assessment of potential interference during communication between mobile radio units and land mobile radio base sites of a land mobile radio system.

Another object of the present invention is to control a land mobile radio base site to establish and conduct communication with mobile radio units so as to avoid potential interference.

A further object of the present invention is to control communications at a local base site so as to minimize the potential for interference with communications at adjacent and remote base sites.

According to the present invention, in a land mobile radio system including at least one base site having a system for interconnecting a plurality of radio channel units in a single trunk group with a plurality of directional antennas and/or antenna beams, each radio channel unit having a receive section and a transmit section and the system dynamically connecting the receive and transmit sections of each one of the radio channel units with any one of the plurality of antennas which, on average, during a sampling period, is best suited for receiving and transmitting RF signals at the operating frequency of the radio channel unit, the base site further includes interference avoidance means for controlling communications between each radio channel unit of the base site and mobile radio units communicating with the base site so as to avoid causing potential interference at the operating frequency of each radio channel unit at other base sites.

According further to the present invention, the interference avoidance means further includes means for monitoring potential interference at the operating frequency of each radio channel unit on each antenna beam.

In further accord with the present invention, potential interference is monitored for each radio channel unit when the radio channel unit is not communicating with a mobile radio unit, and this potential interference is monitored on each antenna at the operating frequency of the radio channel unit.

In still further accord with the present invention, a determination is made that a radio channel unit is not communicating with a mobile radio unit by monitoring the status of a transmit switch associated with the radio channel unit, and when the radio channel unit transmit switch indicates that the radio channel unit is not transmitting, and therefore not communicating with a radio channel unit, a micro-controller controls a scanning receiver, phase lock loop and control switch for determining if the signal strength of receive signals on each of the antenna beams at the operating frequency of the radio channel unit falls within a threshold range, and if it does, the micro-controller determines that potential interference exists.

In still further accord with the present invention, the micro-controller is provided with a memory which is updated by the means for monitoring potential interference, with each antenna being monitored for potential interference at the operating frequency of the radio channel unit at a periodic interval, such 10 to 20 times a second.

According still further to the present invention, if potential interference exists on an antenna beam determined to be the antenna beam best suited for transmitting and receiving RF signals at the operating frequency of the radio channel unit, a determination is made if adjacent antenna beams have reduced chance of potential interference and sufficient signal strength for communication and therefore are better suited for transmitting RF signals at the operating frequency of the radio channel unit.

In still further accord with the present invention, the memory in the micro-controller weights the interference information stored in the memory, with the most recent interference information being weighted more heavily than the older interference information.

In accordance with a second embodiment of the present invention, if potential interference is detected on the beam determined to be best suited to communicate with the mobile radio unit at the operating frequency of the assigned radio channel unit, the system is controlled to select another radio channel unit having a different operating frequency where there is a less likelihood of interference.

In accordance with a second aspect of the interference avoidance means of the invention, when a determination is made concerning the antenna beam or beams best suited for the transmission and reception of RF signals at the operating frequency of a radio channel unit, the present invention compares the signal strength of received RF signals at the operating frequency of the radio channel unit with one or more threshold values, for example by use of a look up table, and makes an assessment as to the proximity of the mobile radio unit to the base site, and wherein the transmission signal strength for signals transmitted from the radio channel unit to the mobile radio unit are controlled based on the proximity assessment.

In further accord with the second aspect of the interference avoidance means of the invention, the transmit switch is provided with adjustable attenuation means which are controlled based on the proximity assessment to thereby inversely control the magnitude of the attenuation of an RF signal provided for transmission in relation to the proximity of a mobile radio unit to the base site such that the attenuation is greatest when the mobile radio unit is in close proximity to the base site.

In still further accord with the second aspect of the interference avoidance means the invention, the transmit switch provides no attenuation when the mobile radio unit is remote from the base site as indicated by a relatively low signal strength of received RF signals from the mobile radio unit, and the transmit switch incrementally increases the attenuation, such as in two steps, e.g., 3 dB and 6 dB, as the signal strength of received RF signals increases, indicating that the mobile radio unit is in closer proximity to the base site.

The present invention provides a significant improvement over the prior art by providing improved monitoring of a base site to determine if communications between the base site and a mobile radio unit will cause potential interference at other base sites. Additionally, the base site is controlled to minimize potential interference during communications with mobile radio units based on the determination of potential interference performed when the radio channel unit is not communicating. Therefore, interference experienced at other base sites already communicating is minimized because of the interference avoidance performed by the base site having the interference assessment of the present invention. Interference avoidance of the present invention is further enhanced by controlling the transmission of RF signals from a base site to be only as strong as necessary to provide reliable communication with the mobile radio unit based on its proximity with the base site.

The foregoing and other objects, features and advantages of the present invention will become more apparent in light of the following detailed description of exemplary embodiments thereof, in view of the accompanying drawings.

DETAILED DESCRIPTION OF THE INVENTION

Figure 1:
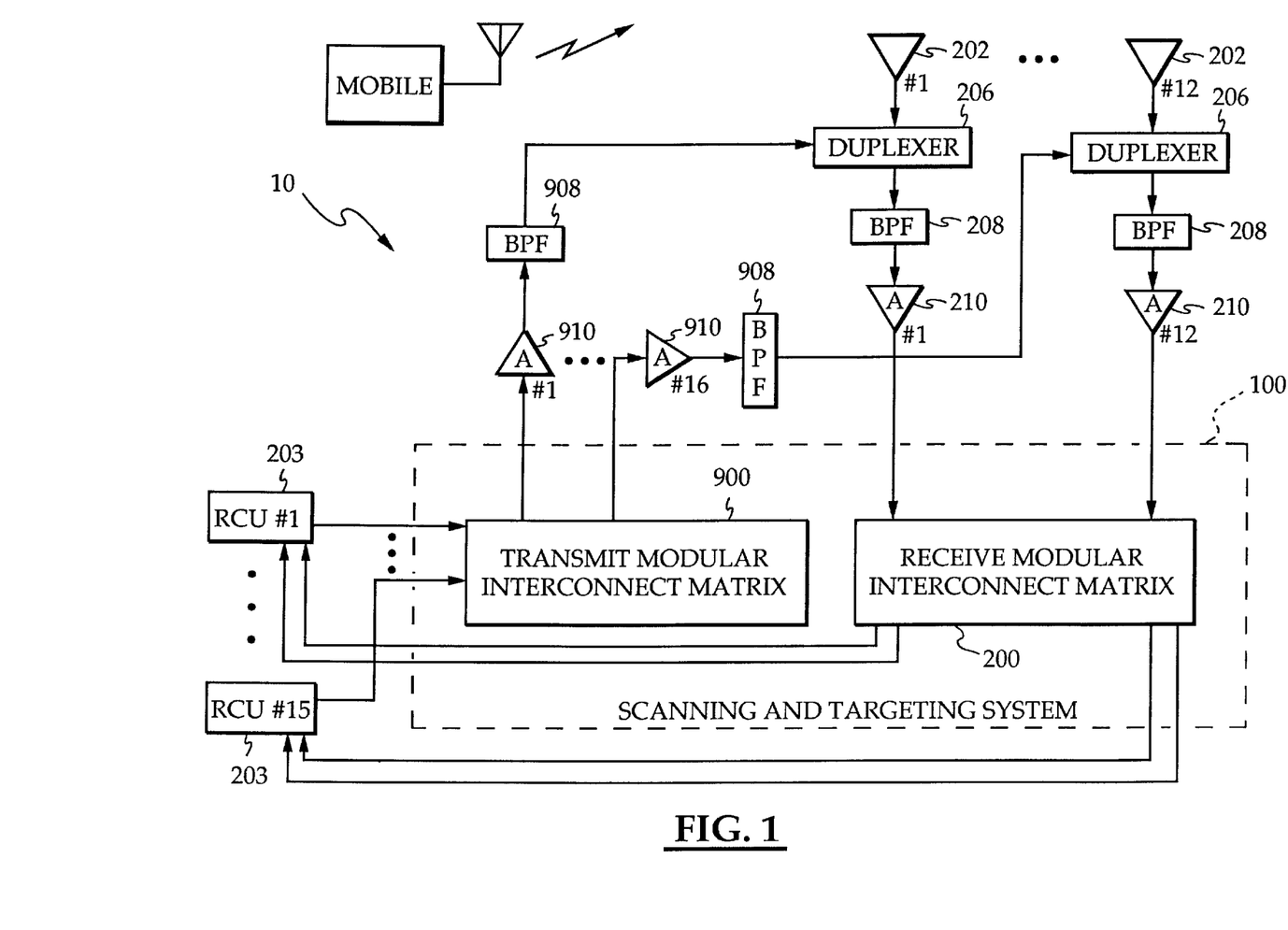
FIG. 1 is a schematic block diagram of a land mobile radio base site having the modular radio signal scanning and targeting system of the present invention.

Referring to FIG. 1, a land mobile radio system base site 10 includes a modular radio signal scanning and targeting system 100. The system 100 is used to dynamically interconnect a plurality (N) of antenna 202 with a plurality (M) of radio channel units (RCU) 203. The radio channel units 203 are transceivers having a transmit section and a receive section. The receive section is typically a diversity receiver having two diversity inputs, e.g., diversity 1 and diversity 2, capable of receiving RF signals from two different sources and selecting the strongest of the two. The scanning and targeting system 100 dynamically connects the receive section of each one of the radio channel units 203 with any two of the antennas 202 which, on average during a sampling period, has the strongest received signal strength of RF signals at the operating frequency of the radio channel unit 203. The antenna having the strongest received RF signal strength is connected to the RCU diversity 1 input and the antenna having the second strongest received RF signal strength is connected to the RCU diversity 2 input. Additionally, the scanning and targeting system 100 dynamically connects the transmit section of each one of the plurality of radio channel units with any one of the plurality of antennas which, on average during a sampling period, is best suited for transmitting RF signals at the operating frequency of the one radio channel unit in a direction corresponding to the desired destination for the transmitted RF signals. A scanning and targeting system of the above-described type is described in commonly owned, copending patent application Ser. No. 08/708,130 filed on Jul. 26, 1996, the disclosure of which is incorporated herein by reference.

An embodiment of the invention is described herein as being used with 12 different narrow-beamwidth antennas 202 for the transmission and receipt of RF signals. These narrow-beamwidth antennas provide the significant benefit of improved signal quality, primarily due to reduced interference. However, it will be understood by those skilled in the art that a variety of different antenna configurations may be used with the invention. The antennas can be though of as separate signal ports for interconnection with transceivers. As an alternative to 12 physically different narrow-beamwidth antennas, each antenna 202 may actually be a particular beam of a multi-beam phase array antenna system, wherein arrays of co-linear radiating elements form each phase array antenna, with the arrays driven by a phase array feed network, so as to generate a plurality of beams or lobes, each of which acts as a separate signal port for the reception or transmission of radio frequency energy in a particular azimuthal direction. Additionally, although 12 antenna beams are shown, different numbers of antennas or antenna beams may be used in different system configurations. In another embodiment of the invention, 16 antenna beams of a multi-beam phase array antenna are used. However, regardless of the number of antennas or antenna beams used, the present invention is equally well understood as described herein with respect to a base site having 12 different antennas or antenna beams.

The antennas 202 are used for the transmission and receipt of RF signals, and a duplexer 206 of a type known in the art is provided for each antenna 202, for controlling each antenna to either transmit or receive RF signals at any one time.

Figure 2:
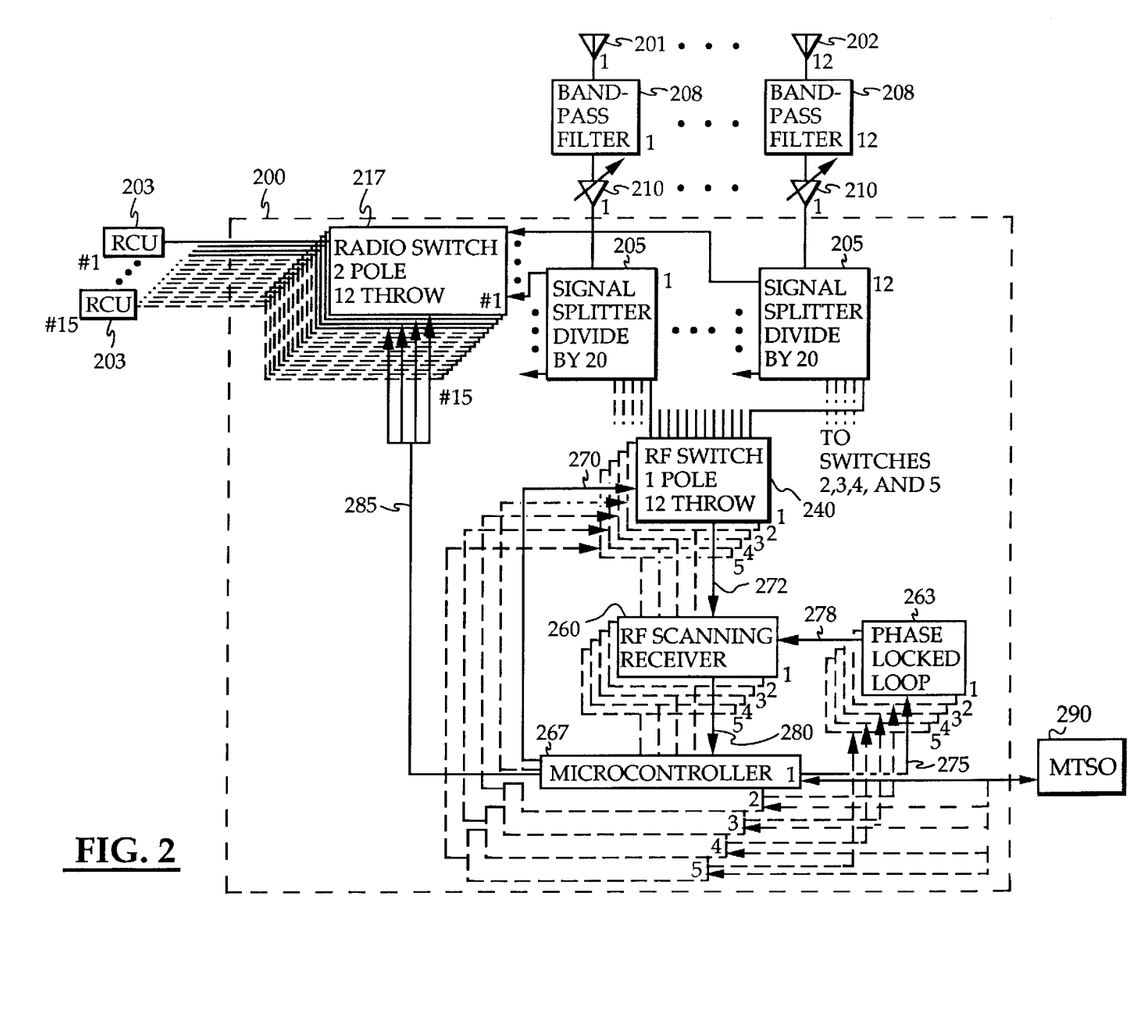
FIG. 2 is a schematic block diagram of a receive modular interconnect matrix of the system of FIG. 1.

Referring also to FIG. 2, the system 100 includes a receive modular interconnect matrix 200, i.e., a modular interconnect matrix which is used to provide signals received on antennas 202 to receive terminals (diversity inputs) mounted on the radio channel units 203. The receive modular interconnect matrix 200 comprises a plurality (N) of signal splitter modules 205, one signal splitter module 205 being associated with each of the antennas 202. Each antenna 202 is connected to its associated signal splitter modules 205 via a duplexer 206, a band pass filter 208, and an adjustable preamplifier 210 which amplifies the received signals before being provided to the signal splitters 205. In FIG. 2, twelve (12) antennas 202 are shown interconnected to twelve (12) signal splitter modules 205. The signal splitter modules 205 are power dividers which divide the amplified RF signals into a plurality (X) of equal parts, e.g., each of the equal parts has an identical signal characteristic (shape) as the amplified RF signal at a fraction (1/X) of the signal strength. For example, a 20-way power divider having a frequency range of 824 to 894 MHZ and an insertion loss of 16 dB may be selected for use as a signal splitter. Each signal splitter module 205 divides the received RF signal into 20 equal power parts.

The receive modular interconnect matrix 200 also comprises a plurality (M) of first switching modules (radio switches) 217. There is one radio switch 217 associated with each radio channel unit 203. Each of the radio switches 217 is interconnected with a pair of receiver connectors (the diversity 1 and diversity 2 inputs) on the corresponding radio channel unit 203. Each radio switch 217 also comprises a plurality of connectors each for interconnection with a corresponding one of the signal splitters 205. Each radio switch 217 includes a 2-pole-N-throw switch which operates under control of control signals provided by a micro-controller 267, which is described in greater detail herein after, for connecting each RCU diversity input with an antenna via the signal splitters 205. The two-pole-N-throw switch may be a two-pole-twelve-throw electronic switch manufactured by the Celwave Division of Radio Frequency Systems, Inc., which is powered by a 15VDC power supply and is controlled by a pulse width modulated data stream containing both timing (clock) data and control (switching) data.

Using the above described arrangement, each one of the radio switches 217 is provided with a portion (1/X) of the RF signal output of each antenna 202 due to the matrix interconnection of the radio switches 217 with the signal splitter modules 205. Therefore, depending on the position of the 2-pole-N-throw switch within the switch module 217, each radio channel unit may be interconnected to any two antennas via its associated switching module 217 and the two signal splitters 205 associated with the two antennas.

A plurality (Y) of control group switches 240 are also provided for interconnection with the signal splitter modules 205. Each control group switch 240 includes a one-pole-N-throw switch which operated under control of control signals provided by the micro controller 267. The one-pole-N-throw switch may be a one-pole-twelve-throw electronic switch manufactured by the Celwave Division of Radio Frequency Systems, Inc., which is powered by a 15VDC power supply and is controlled by a pulse width modulated data stream containing both timing (clock) data and control (switching) data.

Each control group switch 240 is connected between each of the signal splitters 205 and a corresponding RF scanning receiver 260. Associated with each RF scanning receiver 260 is a phase locked loop (PLL) device 263 and a micro-controller 267, e.g., a HC11F1 (MCU) manufactured by Motorola. A more detailed description of the construction and operation of the receive modular interconnect matrix 200 can be found in commonly owned, copending patent application Ser. No. 08/708,130 filed on Jul. 26, 1996, the disclosure of which is incorporated herein by reference.

Associated with a number of radio channel units, for example 3 radio channel units, is a control group in which one of the micro-controllers 267 controls a corresponding phase locked loop 263, RF scanning receiver, control group switch 240, and three radio switches 217. Each radio channel unit 203 transmits and receives RF signals on an assigned (operating) frequency, and the phase locked loop 263 is configured to control the receiving frequency of the RF scanning receiver for sequentially receiving RF signals at three different frequencies, each of the three frequencies corresponding to the operating frequencies of the three radio channel units in its corresponding group. Under control of the micro-controller 267, the control group switch 240 selects one of the twelve antennas 202. The signals provided by the antenna 202 are provided via the band pass filter 208 to the adjustable amplifier 210 where the received signals are amplified. Next the received signal is provided to the corresponding signal splitter module 205 where the signal is divided into 20 equal power parts. One of the equal power parts is provided to each of the control group switches 240.

A control signal is provided on a line 270 from the micro-controller 267 to the control group switch 240 for controlling the position of the one-pole-twelve-throw switch of the control group switch 240 for antenna selection. The part of the amplified RF signal from the selected antenna is provided via the control group switch 240 to a line 272 which is connected to the RF scanning receiver 260. The micro-controller also provides control signals on a line 275 to the phase locked loop 263 to control the phase locked loop to in turn control the receiving frequency of RF scanning receiver 260 so as to sequentially receive RF signals at the three different frequencies corresponding to the three radio channel units within the corresponding group. Control signals are provided by the phase locked loop to the RF scanning receiver 260 on a line 278. First, the RF scanning receiver 260 measures the power level of the RF signal on the line 272 at the first frequency under control of the phase locked loop. The RF scanning receiver provides a signal on a line 280 to the micro-controller 267 indicative of the power level of the signal on the line 272 at the first frequency. After measurements are taken on one antenna, the micro-controller provides a control signal on the line 270 to the control group switch 240 for selection of the next antenna 202. The signal provided by the next antenna 202 is then measured at the first frequency and the measurements is recorded by the micro-controller 267. This procedure is repeated for all antennas 202.

After measurements are taken on all of the antennas at the first frequency, the micro-controller 267 provides a control signal on the line 275 to the phase locked loop 263, which in turn controls the RF scanning receiver 260 to receive RF signals at the second frequency. The RF scanning receiver then provides a second measurement of the power level of the received signal at the second excitation frequency on the line 280 to the micro-controller 267. The micro-controller then provides a control signal on the line 270 to the control group switch 240 for selection of the remaining antennas 202 so that a measurement is taken on each antenna at the second frequency. This procedure is repeated for the third frequency corresponding to the third RCU in the group.

Each antenna 202 is sampled at all three frequencies approximately 8 to 16 times per second, depending on the sampling speed as controlled by the micro-controller 267. The micro-controller 267 maintains a running average of the received signal strength at the three radio channel unit operating frequencies for all twelve antennas, and provides a control signal on a line 285 to each of the radio switches 217 in the corresponding group indicative of the two selected antennas having the strongest signal strength at the operating frequency of the corresponding radio channel unit. The two-pole-twelve-throw switch in the radio switch 217 connects the two diversity inputs to the two selected antennas in response to the control signal on the line 285 from the micro-controller 267. As is known in the art, the radio channel unit diversity amplifier then selects between the two input signals for providing an input to the receiver.

Figure 3:
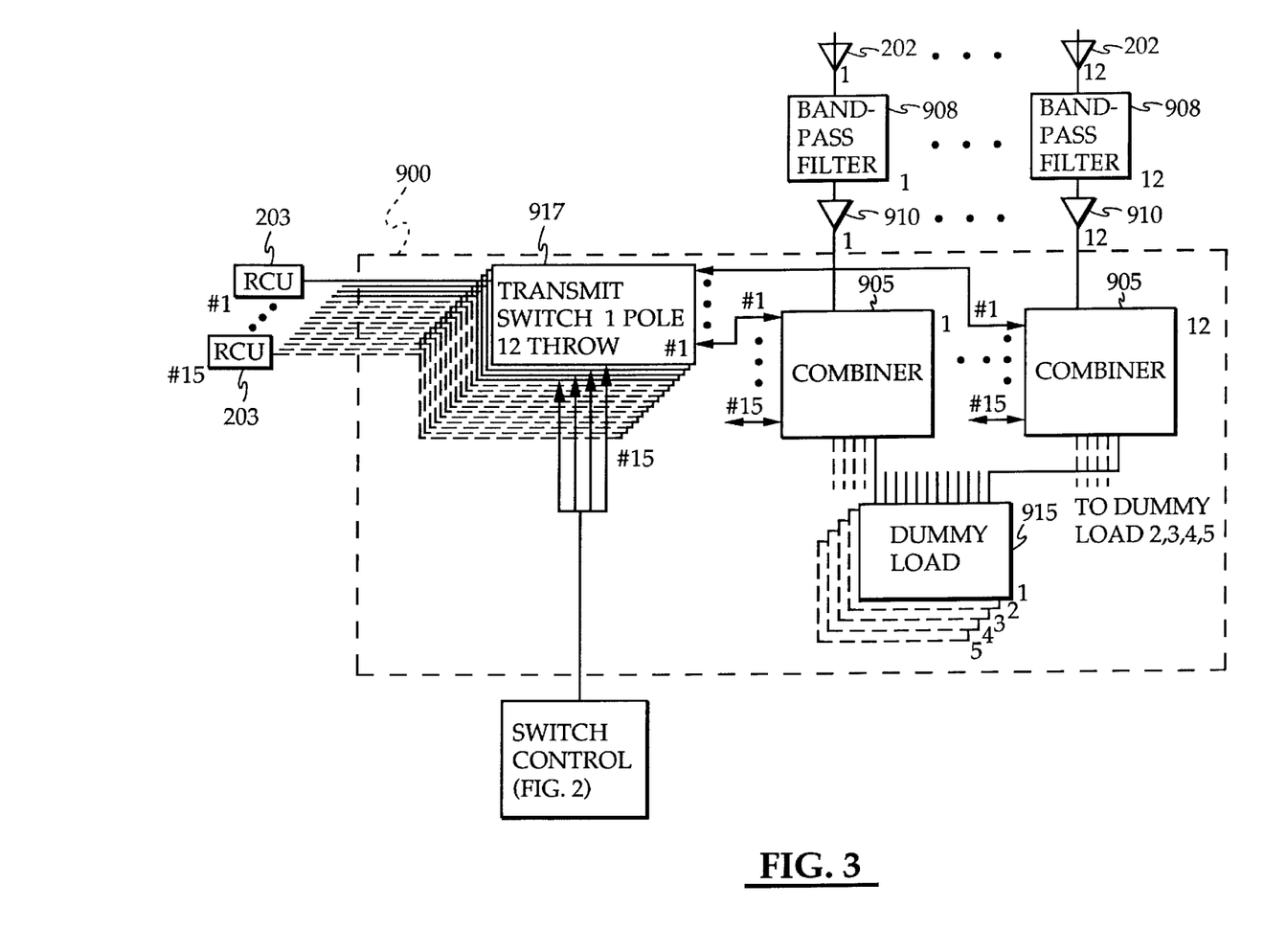
FIG. 3 is a schematic block diagram of a transmit modular interconnect matrix of the system of FIG. 1.

Referring again to FIG. 1, the system 100 also comprises a transmit modular interconnect matrix 900 used to interconnect a plurality of radio channel units 203 with a plurality of antennas 202 for the transmission of signals provided by the radio channel units 203 via the antennas 202. Referring also to FIG. 3, the transmit modular interconnect matrix 900 is similar to the receive modular interconnect matrix 200 except that it includes a transmit switch 917 interconnected to a transmit terminal of each radio channel unit 203 (instead of a radio switch). Additionally, the signal splitter modules 205 (FIG. 2) are replaced with combiner modules 905 which combine RF signals provided by the various radio channel units into a combined RF signal which is provided from each combiner module 905 via an amplifier 910 and filter 908 to an antenna 202 for transmission. For purposes of controlling the transmit modular interconnect matrix 900, it is assumed that the antenna 202 indicated as having the strongest received signal strength at the operating frequency of the radio channel unit 203 is the best antenna for transmission of signals provided by the radio channel unit 203, and therefore, a control group switch and corresponding scanning receiver, phase locked loop, and micro-controller are not required in the transmit modular interconnect matrix 900. Instead, each transmit switch of the transmit modular interconnect matrix 900 is controlled to interconnect the transmit terminal of the radio channel unit with the antenna having the strongest signal strength at the operating frequency of the corresponding radio channel unit. Additionally, since the control group switches are not required in the a transmit modular interconnect matrix 900, the combiner modules 905 may be configured for connection with dummy loads 915 mounted to the combiner connectors which are not used. Alternatively, each combiner module 905 may be provided with only enough connectors for interconnection with the transmit switches.

Figure 4:
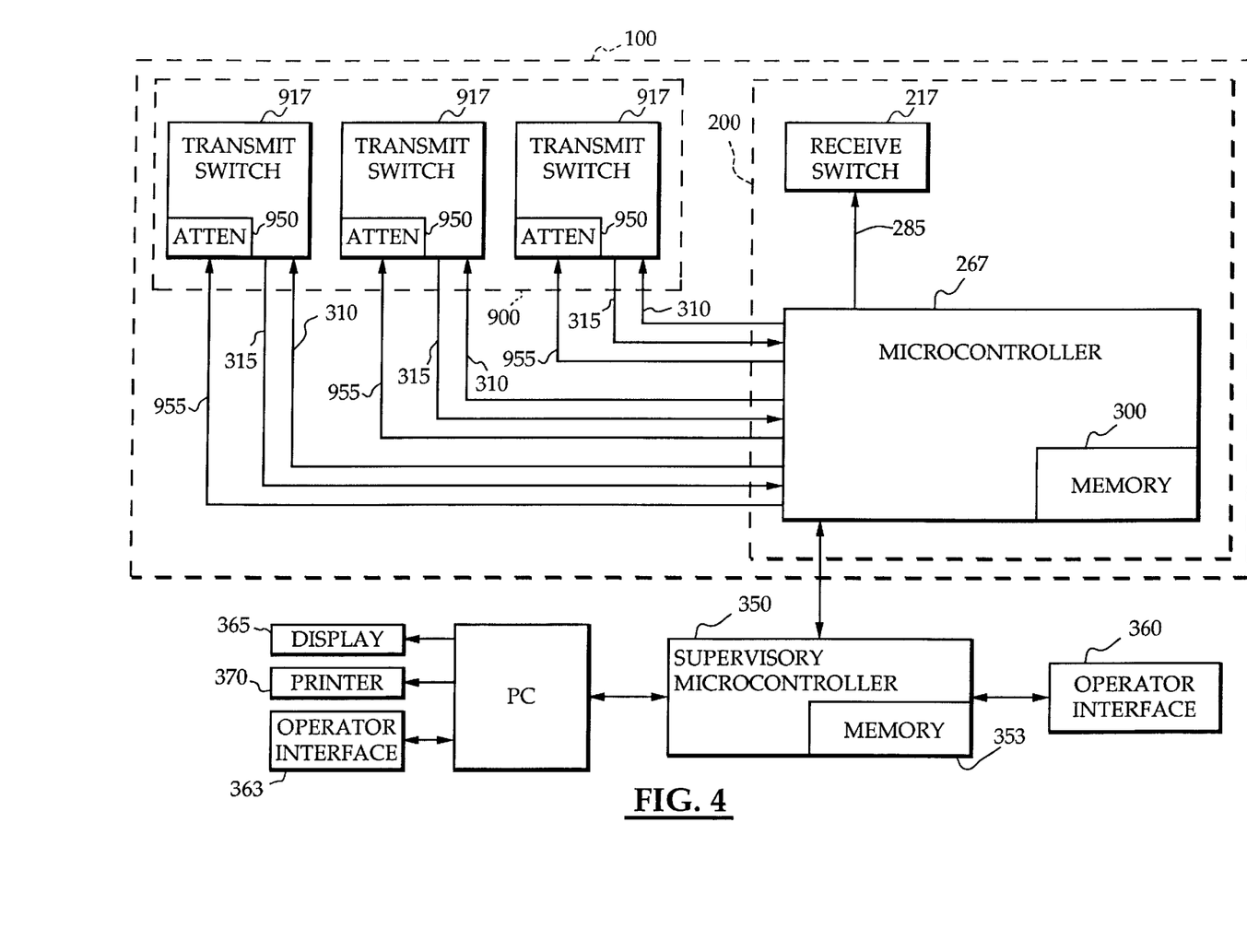
FIG. 4 is a schematic block diagram of interference assessment of FIG. 1.

The continuous interference assessment of the present invention interacts with both the receive modular interconnect matrix 200 and the transmit modular interconnect matrix 900 for monitoring, storage and display of information indicative of potential signal interference in a land mobile radio base system. Referring to FIG. 4, the micro-controller 267 includes a memory 300 for storing data indicative of potential communication interference. During communications between a mobile unit and the base site, after communications have been established, each radio channel unit continuously transmits a carrier frequency modulated by a supervisory audio tone which is received by the mobile unit. The communications may be established between the mobile unit and the base site in a number of ways, for example as described in commonly owned copending application Serial No. (Ware, Fressola, Van Der Sluys & Adolphson Docket No. 916-080) filed on even date herewith, the disclosure of which is incorporated by reference. This supervisory audio tone is provided by the radio channel unit via the transmit switch 917, combiner, amplifier, bandpass filter for transmission via the antenna. As described above, the particular antenna which is utilized to transmit the supervisory audio tone and other communications from the radio channel unit to the mobile unit is determined by the transmit switch under control of control signals provided on the line 310 from the micro-controller 267. The selected antenna corresponds to the antenna indicated as having the strongest signal strength of receive signals at the operating frequency of the radio channel unit.

Each transmit switch 917 is responsive to an RF signal being provided by its corresponding radio channel unit for providing a transmit detect signal on the line 315 to the micro-controller 267. The transmit detect signal indicates that the corresponding radio channel unit is communicating (transmitting an RF signal) via the selected antenna. The micro-controller 267 is responsive to the absence of a transmit detect signal on the line 315 from each transmit switch for performing interference assessment at the operating frequency of the corresponding radio channel unit.

Referring to FIGS. 2–4, in order to perform continuous interference assessment, the control group associated with the radio channel unit is utilized. In the absence of the transmit detect signal provided on the line 315 by the transmit switch 917 corresponding to the radio channel unit 203, the micro-controller 267 controls the control group switch 240, scanning receiver 260 and phase lock loop 263 to sample the RF input from each antenna 202 at the operating frequency of the radio channel unit 203. This sampling is continuously performed once each sampling interval, for example 10 to 20 times a second for each antenna or antenna beam. The signal strength of RF signals at the operating frequency of the radio channel unit is determined by the RF scanning receiver 260, and a signal indicative of the magnitude of this signal is provided by the RF scanning receiver 260 on the line 280 to the micro-controller 267. The micro-controller 267 then performs a test comparing the received RF signal strength to a threshold range, such as −75 dBm to −105 dBm. If the magnitude of the signal falls within the threshold range, it is determined that this signal represents a potential interferer. The results of this test are stored in the memory 300.

The information stored in the memory 300 for each antenna beam for each radio channel unit is weighted based on the time it was received. The more recent interference information is weighted more heavily than the older interference information. For example, interference information may be updated during a sampling period, such as a 15-minute time interval. At the end of the sampling period, the interference information previously stored in the memory is scaled down and then accumulated with the newly received data during the sampling period. Therefore, the information received during the most recent sampling period is given the most emphasis, however, the system does keep a history of interference information.

As discussed above, a number of radio channel units 203 are associated in a control group with each micro-controller 267. In the example of FIG. 4, there are 3 radio channel units 203 associated with each micro-controller 267. Therefore, the memory 300 stores interference information associated with the 3 radio channel units. The information stored in the memory 300 of the micro-controller is indicative of the interference, i.e., the number of times that a particular beam is sampled and has a potential interferer (signal strength at the operating frequency of the radio channel unit within the threshold range) which indicates an interferer.

The information stored in the memory 300 of the micro-controller 267 may be downloaded on a periodic basis, for example hourly, to a supervisory micro-controller 350 to thereby provide the operator of the base site with information indicative of interference for all of the radio channel units on each of the antenna beams.

The supervisory micro-controller 350 may be provided with an operator interface 360 so that the operator of the base site can select interference information for monitoring, display and printing. The supervisory micro-controller may also be interconnected via a computer (PC) with a remote operator interface 363, a visual display 365 for viewing by the operator of the base site, and a printer 370 for printing a hard copy report indicative of the interference information. The supervisory micro-controller 350 includes a memory 353 for storing the interference information retrieved from each of the micro-controllers 267.

Figure 5:
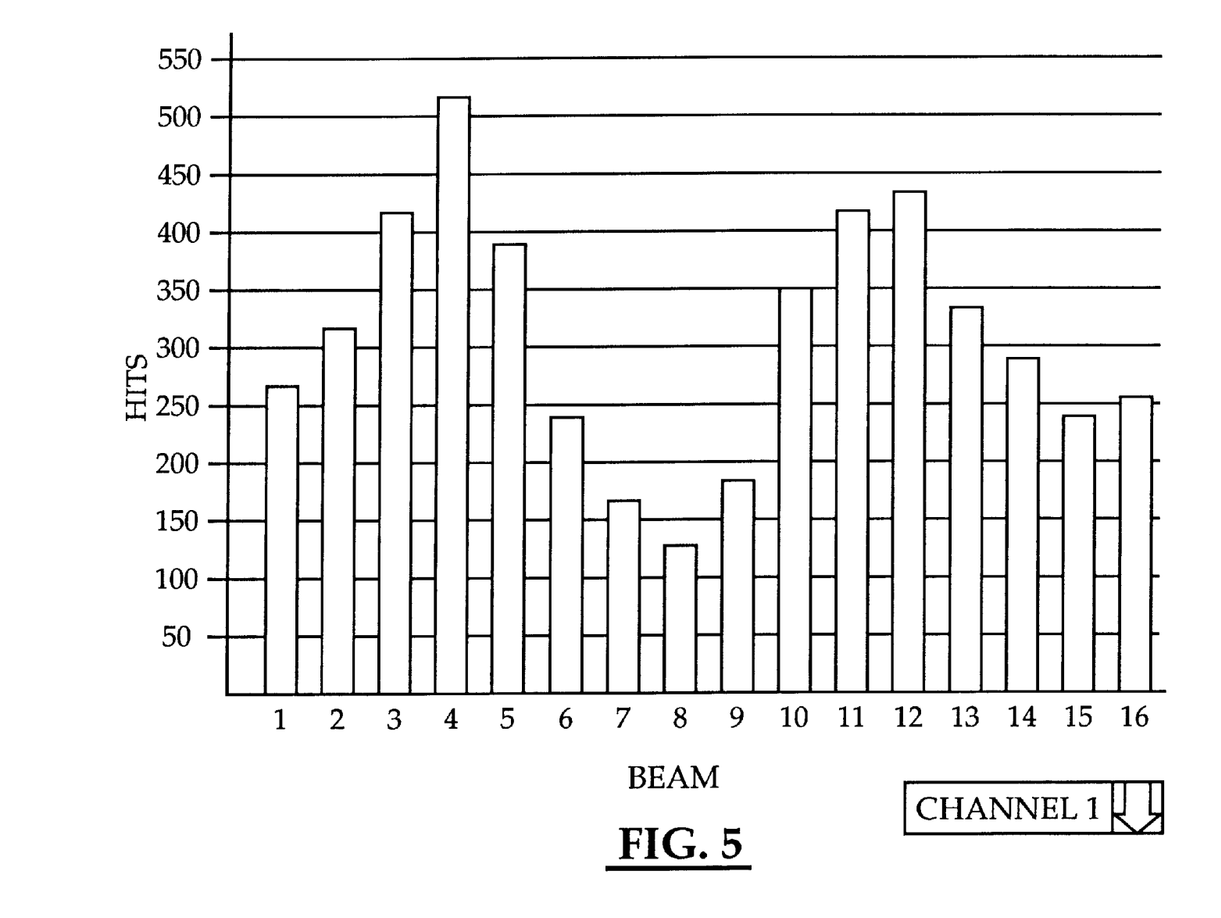
FIG. 5 is an illustration of a display provided by the system of FIG. 4.

An example of the data display which can be obtained from the supervisory micro-controller 350 for display or printing is illustrated in FIG. 5. Referring to FIG. 5, the display illustrates the number of potential interference occurrences for a particular channel on each of the antenna beams during a weighted sampling period. While FIG. 5 illustrates a weighted sampling period, it will be understood by those skilled in the art that various sampling periods may be selected for the display of interference information, and the information may or may not be weighted as desired.

Returning to FIGS. 2, 3 and 4, the interference information stored in the memory 300 of the micro-controller 267 is utilized by the micro-controller for controlling the transmission of RF signals. As discussed above, when a call is set up between a mobile radio unit and the base site 10, the micro-controller 267 controls the control group equipment to monitor the antenna beams to determine the antenna beams having the strongest received signal strength of RF signals at the operating frequency of the radio channel unit. Once the micro-controller 267 determines the best beam (beam having the strongest received signal strength of RF signals at the operating frequency of the radio channel unit) for the next call associated with a particular radio channel unit it monitors the memory containing the interference information to determine if interference has been received on that beam for the frequency of the radio channel unit.

As will be understood by those skilled in the art, if another radio channel unit is communicating with a distant base site at the same frequency as the particular radio channel unit of the current base site, if the current base site transmits RF signals at that same frequency on a beam pointing in the direction of the distant base site, potential interference will occur at the distant base site. Therefore, if the micro-controller determines that there is potential interference on a particular beam, it will try to use adjacent beams for transmission of RF signals to avoid possible interference. In this case, the micro-controller 267 looks at the two adjacent beams on either side of the beam determined to be the best beam.

There are several criteria that the micro-controller will examine to determine if an alternate beam should be utilized in situations of potential interference for the transmission of RF signals. First, although not necessary, the micro-controller may look at the supervisory audio tone on the alternate beams to ensure that it is considering the appropriate mobile radio unit and not another mobile radio unit operating at the same frequency. However, the signal strength of the received signal is typically of sufficient magnitude such that a check of SAT is not necessary. For a given radio channel unit, the micro-controller will then determine the adjacent beam having the strongest signal strength. Finally, the micro-controller looks at the potential interference history to determine if there is also potential interference associated with the alternate beam. If the micro-controller determines that an adjacent/alternate beam has a sufficient signal strength, proper supervisory audio tone and a low degree of potential interference, it will select the adjacent/alternate beam as the beam for transmitting RF signals. Thereafter, the beam originally determined to be the best beam will be utilized as the diversity beam for purposes of receiving RF signals, but the alternate beam will be used for the transmission of RF signals to thereby minimize the potential for interference at a distant base site. Therefore, as explained above, the interference assessment of the invention prevents interference at remote base sites by steering the transmission beam away from the remote base sites. Primarily, the interference assessment is concerned with avoiding the transmission of RF signals in the direction that would cause potential interference and the avoidance of potential interference.

In a second embodiment of the invention, rather than selecting a different beam to transmit on, the system may select an alternative frequency to communicate on that does not have interference. This involves the selection of an alternative radio channel unit for communications with the mobile radio unit. As is known in the art, the determination of the frequency, and therefore radio channel unit, for communications with a mobile radio unit is typically determined by a mobile telephone switching office (MTSO) 290 which communicates this decision to the base site, for example by communications directly with the micro-controller 267, or alternatively, the supervisory micro-controller 350. Therefore, in order for this alternative embodiment to be implemented in known mobile telephone systems, the interference information must be provided to the MTSO so that the MTSO can evaluate other potential frequencies for communications to thereby minimize interference in a land mobile radio system.

Referring again to FIGS. 2, 3 and 4, as described above, the micro-controller 267 stores information indicative of the received RF signal strength at the operation frequency of the radio channel units 203 in a corresponding group to thereby control the transmit switch 917 and the radio switch 217 such that the RCU is interconnected to the antenna(s) best suited for the transmission and reception of RF signals at the operating frequency of the RCU. As illustrated in FIG. 4, each transit switch 917 includes an adjustable attenuation means 950, such as an attenuation pad, which may be used to attenuate the signals provided by the corresponding radio channel unit 203 for transmission. The adjustable attenuation means 950 are controlled by control signals provided by the micro-controller 267 on the line 955.

In the example of the present invention, the adjustable attenuation means 950 has three attenuation levels: no attenuation, 3 dB and 6 dB. However, it will be understood by those skilled in the art that different magnitudes and amounts of attenuation may be used, depending on the particular implementation. The micro-controller compares the signal strength of received RF signals from a mobile radio unit to various threshold magnitudes. The threshold magnitudes may be implemented as comparisons with thresholds stored in memory, or comparisons with a look-up table stored in a memory, or any other suitable way know in the art to evaluate the magnitude of a signal with respect to multiple threshold levels/magnitudes. These threshold magnitudes may be correlated with the proximity of the mobile radio unit to the base site, e.g., the closer the mobile radio unit is to the base site, the greater the magnitude of the received signal strength. The invention utilizes the principle that the closer the mobile radio unit is to the base site, the lower the magnitude that the base site must transmit RF signals to the mobile radio unit and still provide reliable communications. Therefore, if the signal strength of received RF signals is below a first threshold magnitude, the micro-controller controls the transmit switch to place no attenuation in the signal path of RF signals provided by a corresponding radio channel unit for transmission. If the signal strength of received RF signals is above the first threshold magnitude, the micro-controller controls the transmit switch to place a first attenuation, such as 3 dB, in the signal path of RF signals provided by a corresponding radio channel unit for transmission. Similarly, if the magnitude of received RF signals exceeds a second, higher threshold magnitude, then a second, larger attenuation, such as 6 dB, is placed in the transmission signal path by the transmission switch.

The variable attenuation of transmitted RF signals greatly enhances overall communications within a land mobile radio system having a plurality of base sites. By reducing the transmission of RF signals from a base site, the potential for interference at remote base sites is reduces. Although the invention is described as using three attenuation lever, 0, 3 and 6 dB, it will be understood by those skilled in the art that various levels of attenuation may be used, depending on the particular system. Alternatively, a variable attenuation may be used if desired.

Although the invention has been described herein with respect to exemplary embodiments thereof, it will be understood by those skilled in the art that the foregoing and various other changes, omissions and additions may be made therein and thereto without department from the spirit and scope of the present invention.

What is claimed is:

1. A land mobile radio base site, comprising:
   a plurality of radio channel units each having a transmit section for transmission of signals;
   a plurality of antenna means each for transmitting the signals provided by one or another of the radio channel units in a beam direction;
   control system means for connecting said transmit section of each one of said plurality of radio channel units with any one of said plurality of antenna means; and
   said control system means including interference avoidance means for controlling communications between said plurality of radio channel units of the base site and mobile radio units communicating with the base site so as to avoid causing potential interference at other base sites, wherein said control means further includes at least one memory means for storing information indicative of said potential interference, wherein said information stored in said memory means is weighted based on a relative time said information is stored in said memory means, and wherein said information stored more recently in time is weighted more heavily, and further wherein said information indicates, for a radio channel unit and a beam direction, how often a signal in the beam direction with a signal strength in a predetermined range is received while the radio channel unit is not transmitting on the frequency of the radio channel unit.

2. A land mobile radio base site according to claim 1, wherein said interference avoidance means includes monitoring means for monitoring potential interference at the operating frequency of each radio channel unit on each antenna means.

3. A land mobile radio base site according to claim 2, wherein said monitoring means is responsive to a respective radio channel unit not communicating with a mobile radio unit for monitoring potential interference at the operating frequency of said respective radio channel unit on each antenna means.

4. A land mobile radio base site according to claim 2, wherein said monitoring means includes means for determining if the signal strength of receive signals on each of said antenna means at the operating frequency of a respective radio channel unit falls within a threshold range, and if it does, for determining that potential interference exists.

5. A land mobile radio base site according to claim 4, wherein said control system is responsive to potential interference being detected on a selected antenna means selected for transmitting signals at the operating frequency of said respective radio channel unit for determining if an alternative antenna means is determined to have reduced chance of potential interference than said selected antenna means and for connecting said transmit section of said respective radio channel unit to said alternative antenna means provided that it is suited for transmitting signals at the operating frequency of said respective radio channel unit.

6. A land mobile radio base site according to claim 2, wherein in responsive to potential interference being detected on a selected antenna means selected for transmitting signals at the operating frequency of said respective radio channel unit, another radio channel unit having a different operating frequency is selected for communications.

7. A land mobile radio base site according to claim 1, wherein said control system means includes a plurality of transmit switches, a respective transmit switch being connected to said transmit sections of a respective radio channel unit, said control system controlling each transmit switch for connecting said transmit section of said respective radio channel unit with any one of said plurality of antenna means.

8. A land mobile radio base site according to claim 7, wherein each respective transmit switch is responsive to signals provided by said transmit section of said respective radio channel unit for providing a transmit detect signal, and wherein said monitoring means is responsive to the absence of said transmit detect signal for monitoring potential interference at the operating frequency of said respective radio channel unit on each antenna means.

9. A land mobile radio base site according to claim 1, wherein said control system means includes:
   means for measuring the signal strength of received signals at the operating frequency of each radio channel unit on each antenna means, and for providing signal strength signals indicative thereof;
   selection means responsive to said signal strength signals for providing a selection signal indicative of a respective antenna means for connection with said transmit section of a respective radio channel unit;
   proximity means responsive to said signal strength signals for providing a proximity signal indicative of the proximity of a mobile radio unit to the base site; and
   transmit signal strength means responsive to said proximity signal for providing a transmit signal strength signal for controlling the transmission signal strength of signals transmitted by said transmit section of said respective radio channel unit via said respective antenna means.

10. A land mobile radio base site according to claim 9, wherein said control system means includes a plurality of transmit switches, each transmit switch being connected to said transmit section of a corresponding radio channel unit, said transmit switches being responsive to said selection signals for connecting said transmit section of said corresponding radio channel units with any one of said plurality of antenna means.

11. A land mobile radio base site according to claim 10, wherein each transmit switch includes adjustable attenuation means responsive to said transmit signal strength signal for attenuating signals provided by said transmit section of said corresponding radio channel unit.

12. A land mobile radio base site according to claim 11, wherein said adjustable attenuation means is controlled to inversely control the magnitude of attenuation of signals provided for transmission in relation to the proximity of a mobile radio unit to the base site such that the attenuation is greatest when the mobile radio unit is in close proximity to the base site.

13. A land mobile radio system according to claim 1, wherein each antenna means provides coverage in a selected azimuthal direction, and the number and beam width of each antenna means are selected and arranged to provide 360° of coverage for the base site, and wherein said information indicative of said potential interference includes the amount of time said plurality of radio channel units utilize each said selected azimuthal direction.

14. A land mobile radio system according to claim 13, wherein each antenna means is a beam of a multi-beam phase array antenna system, each beam acting as a separate signal port for the reception or transmission of radio frequency energy in said selected azimuthal direction.

15. A land mobile radio system according to claim 13, wherein each antenna means is an individual antenna for the reception or transmission of radio frequency energy in said selected azimuthal direction.

* * * * *

UNITED STATES PATENT AND TRADEMARK OFFICE
CERTIFICATE OF CORRECTION

PATENT NO. : 6,052,605
DATED : April 18, 2000
INVENTOR(S) : Meredith et al.

It is certified that error appears in the above-identified patent and that said Letters Patent is hereby corrected as shown below:

On the title page, item [75] "Pheonix" should be --Phoenix--; and under the References Cited, the "Foreign Documents" delete 2 foreign documents listed on Examiner's NOtice of References Cited, namely:

725498A1    1/1996    EP
    97/315013    8/97    WIPO...HOQ 7/38

Signed and Sealed this

Twenty-seventh Day of February, 2001

Attest:

NICHOLAS P. GODICI

Attesting Officer      *Acting Director of the United States Patent and Trademark Office*